United States Patent [19]

Bastiaans

[11] 3,851,841

[45] Dec. 3, 1974

[54] HIGH SPEED TAPE CASSETTE

[75] Inventor: Cedric R. Bastiaans, Verona, Pa.

[73] Assignee: Westinghouse Electric Corporation, Pittsburgh, Pa.

[22] Filed: May 18, 1972

[21] Appl. No.: 254,691

[52] U.S. Cl. .................... 242/199, 226/196, 242/76, 242/210

[51] Int. Cl. .................... G11b 23/10

[58] Field of Search ...... 242/199, 200, 76; 226/196, 226/198, 197, 210, 192, 194, 55.19 A

[56] References Cited

UNITED STATES PATENTS

| | | | |
|---|---|---|---|
| 3,143,270 | 8/1964 | Cohen | 242/76 X |
| 3,523,657 | 8/1970 | Hearon, Jr. et al. | 242/200 |
| 3,598,339 | 8/1971 | Saito | 242/199 |
| 3,600,071 | 8/1971 | Downey | 242/199 |
| 3,642,229 | 2/1972 | Downey et al. | 242/199 |

*Primary Examiner*—George F. Mautz
*Attorney, Agent, or Firm*—M. P. Lynch

[57] ABSTRACT

A miniature reel-to-reel magnetic tape cassette for a high speed dubbing system capable of achieving tape speeds as high as 120 inches per second or higher. The cartridge incorporates means for facilitating driving of the tape by a relatively large diameter high speed capstan, utilizes a conductive liner for preventing the build-up of static electricity at the high tape speeds employed, and incorporates self-centering concave rollers around which the high speed tape travels in passing from a pay-off reel to a take-up reel.

2 Claims, 9 Drawing Figures

HIGH SPEED TAPE CASSETTE

BACKGROUND OF THE INVENTION

While not necessarily limited thereto, the present invention is particularly adapted for use in audio-tutorial tape systems used to provide individualized instruction in educational institutions and the like. In its simplest form, a system of this type comprises a number of pre-recorded tapes which may be checked out in the school library and played back in carrels, set up in the library. These tapes are pre-recorded by the instructor for the course and are prepared as supplemental information to reinforce homework assignments, lectures, new techniques and the like. One particular advantage of the audio-tutorial system is that it provides frequent, independent and repetitious tutoring to a student without requiring the time of the instructor.

The simplest embodiment as described above, however, has severe limitations. Each time a tape is checked out by a student, it stays out for as long as the student needs it which, with all the time required to repeat several portions of it, will be very much longer than its real-time playback of about 30 minutes. During this time, of course, the tape in question is not available to other students. The provision of multiple copies of each tape is one way of solving the problem. However, this creates a huge inventory problem aside from the problem of projecting the extent of the demand for any one tape.

A way of eliminating the problem or reducing it to an extremely small magnitude is to provide the student with his own, personal copy of the desired tape, such as that in a small tape cassette, which he can then utilize to the fullest extent without hampering his student colleagues. In this respect, the desired program can be dubbed (i.e., re-recorded) onto the student's personal tape cassette at a high rate of speed. The student is then free to play the cassette at his convenience, either in his personal cassette playback unit or in one of the carrels located in the school library. Furthermore, a system of this sort allows the student to collect an entire set of tutorial tapes for any course that he takes, and which he can play back at any time. The only time a program is not available to a student is when it is being used to dub some other student's cassette. Of course, it is of prime importance that the time required for dubbing be kept to a minimum. In this respect, it is desirable to provide a system wherein a 60-minute program, for example, requires less than one-half minute to dub. This, however, requires tape speeds as high as 120 inches per second or higher.

The cassette used by the student for such a high speed dubbing system is preferably of the miniature reel-to-reel type which has outside dimensions of about 2½ inches by 4 inches and a tape width of only one-eighth inch. The cassette comprises a casing formed of upper and lower mating halves containing a pair of tape reels, guiding means for guiding the tape past a recording head as the tape travels from one reel to the other, and a capstan drive arrangement for the tape. Ordinarily, the take-up reel is driven by means of a central shaft while the pay-off reel is braked, again by a central shaft connected to a braking means. The speed of the tape, however, is determined by the aforesaid capstan drive. The capstan, together with a rubber tire pinch roller, couples the tape to an external drive system and is normally of small diameter, typically about one-sixteenth inch. The low tape speed of less than 2 inches per second during a normal playback operation does not require a larger diameter capstan. However, higher tape speeds with such a small diameter capstan present problems such as high " wow" and flutter rates. Furthermore, the chance of slip between the tape and the capstan drive increases as tape speed increases.

The cassette body of prior art miniature cassettes is provided with a hole which accepts the insertion of the capstan on one side of the tape. During a recording or playback sequence, a rubber tire pinch roller external to the cassette is moved into engagement with the tape directly opposite the capstan such that as the capstan is forced to rotate, the tape will be advanced between it and the pinch roller. The diameter of a capstan such as that used in prior art arrangements could be increased but, of course, there is an upper limiting size determined by the dimensions of the miniature cassette.

In addition to the problems involved in driving the tape of a miniature cassette at very high speeds, there is an additional, unexpected problem. The constant friction between the plastic (usually MYLAR) backing tape and the plastic wall of the cassette (or the plastic liner often used) will create the buildup of an electrostatic charge at high tape speeds. This buildup becomes high enough to cause sparking, which may interfere with the recording or may even cause damage to the tape.

Finally, at the high tape speeds involved, there is a serious problem in guiding the tape from the pay-off reel, around guiding rollers and the like, past the pickup head and thence to the take-up reel. Miniature cassettes presently manufactured utilize various means to guide the thin tape around the inside corners of the cassette. These may comprise stationary posts in the two lower corners of the cassette, of either simple rod construction or with a more elaborate configuration such as fixed collars or loose washers on both ends of the posts for keeping the tape in place. In some cases, rollers are used instead of fixed posts, again with or without collars or washers. While all of these configurations are adequate for a slow tape speed of, for example, 1⅞ inches per second, they are not adequate for the much higher tape speeds in the range of about 120 inches per second as required for high speed tape dubbing.

SUMMARY OF THE INVENTION

In accordance with the present invention, an improved miniature cassette system is provided capable of being used in a high speed dubbing system wherein the tape must travel at speeds of 120 inches per second or higher, and wherein the buildup of electrostatic charges on the tape is essentially eliminated.

This is accomplished by driving the tape by a capstan external to the cassette itself, the tape passing between this capstan and a rubber or the like backup roller which passes through an opening in the cassette on the side of the tape opposite the capstan. In this manner, the diameter of the driving capstan is not limited by the physical dimensions of the cassette itself; a motor of lower rotational speed can be used to drive the capstan; and since the rubber backup roller engages the backside of the tape, the danger of depositing rubber "dust" on the oxide surface of the tape with consequent occurrence of signal dropouts is greatly reduced.

In order to prevent the buildup of static electricity on the high speed tape within the cassette, it is lined with an electrically conductive liner which may be formed either of conductive plastic, metal foil or conductive paper. Such a liner connected to a large metallic mass such as the ground plane of the cassette deck through tabs extending through the wall of the cassette bleeds the electrostatic charge away and prevents sparking which might otherwise occur with the high speeds encountered.

The guide rollers at the corners of the cassette in accordance with the invention are of the hourglass or concave type in order that the tape, in passing around these rollers, will automatically center itself and will not tend to creep off the rollers in one direction or the other.

The above and other objects and features of the invention will become apparent from the following detailed description taken in connection with the accompanying drawings which form a part of this specification, and in which.

Figures 1, 2, 3:
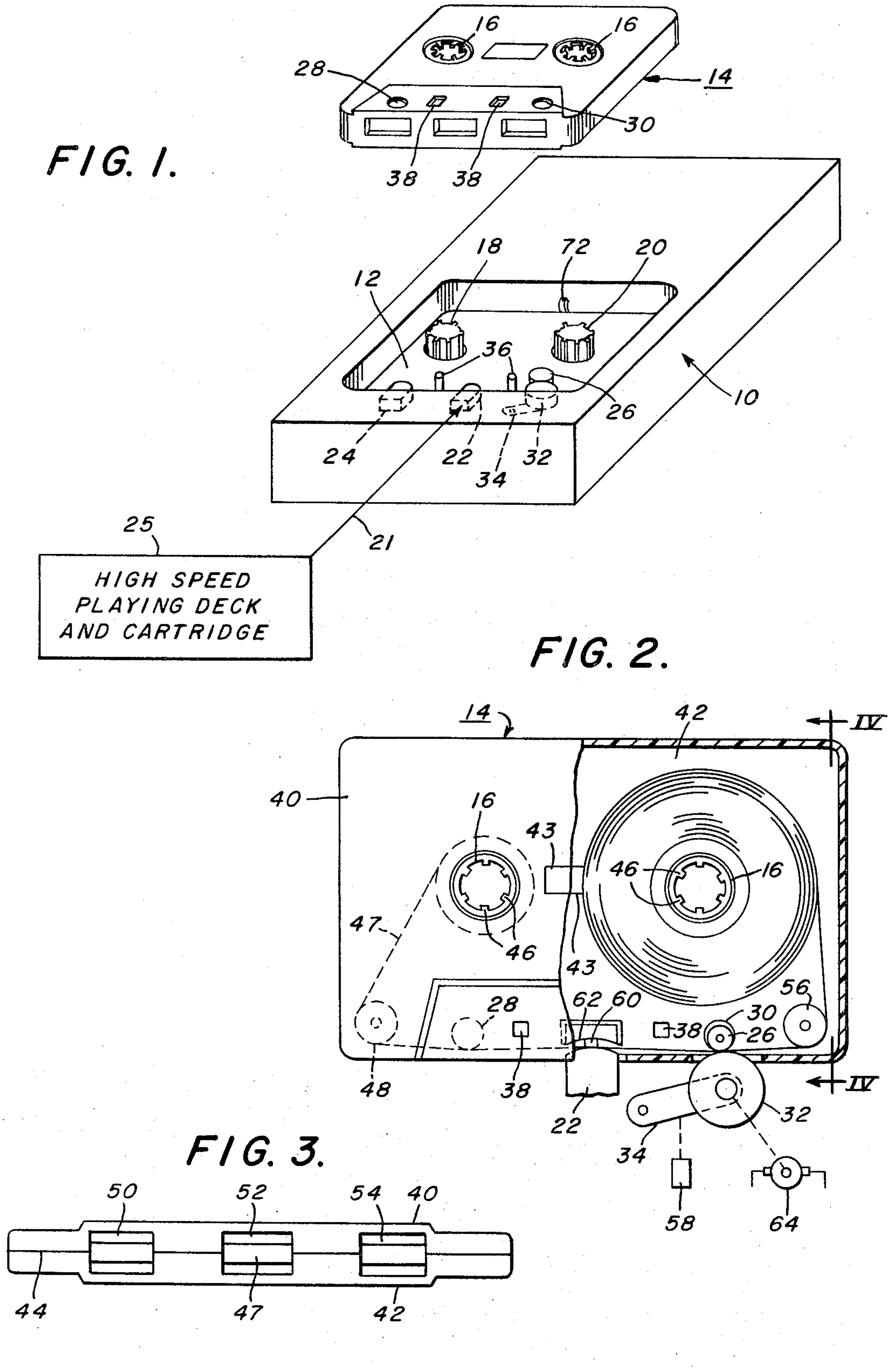
FIG. 1 is a perspective view of the high speed miniature cassette of the invention showing the manner in which it is inserted into a recording or playback deck.
FIG. 2 is a partially broken-away top view of the cassette of the invention showing the manner in which a driven capstan engages a rubber or the like roller projecting through an opening in the cassette.
FIG. 3 is a front view of the cassette of FIG. 2.

With reference now to the drawings, and particularly to FIG. 1, there is shown a housing 10 having a recessed recording or playback deck 12 adapted to receive a miniature cassette 14, hereinafter described in detail. Within the cassette 14 are take-up and pay-off reel devices for magnetic tape having hubs 16 adapted to fit over and engage splined shafts 18 and 20 projecting upwardly from the deck 12. During a dubbing operation, the shaft 18 is connected to a braking device; whereas the shaft 20 is driven by a take-up motor in a manner hereinafter described.

Provided at the forward edge of the tape deck 12 are recording or playback and erase heads 22 and 24, respectively. Projecting upwardly from the tape deck 12 is a rubber or the like idler roller 26 adapted to pass into opening 28 or 30 when the cassette is on the playing deck 12. As will hereinafter be explained, the roller 26, when in opening 30, for example, will cooperate with a motor driven capstan 32 pivotally mounted on arm 34 for the purpose of advancing the tape past the head 22. Pins 36 projecting upwardly from the tape deck 12 enter openings 38 in the cassette and serve to position the cassette with respect to the capstan and the head.

Figure 4:
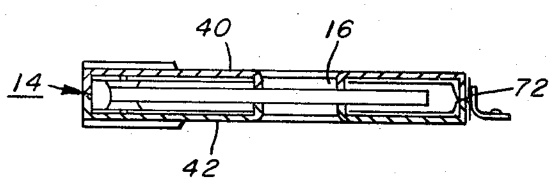
FIG. 4 is a cross-sectional view taken substantially along line IV—IV of FIG. 2.

With reference now to FIGS. 2–4, the cassette 14 is formed from upper and lower mating halves 40 and 42 joined along a seam 44 (FIG. 3). Carried within the cassette are the two hubs 16, one acting as a take-up reel device and the other as a pay-off reel device, although in most cases the hubs do not have radially-extending flanges as in conventional reels. In this respect, the tape is constrained between the upper and lower walls of the cassette as it is wound on or unwound from a hub. The hubs have central openings provided with ribs 46 for engagement with splines on the shafts 18 and 20 shown in FIG. 1. Upon counterclockwise rotation of the hubs 16, for example, a ribbon of tape 47 will pay-off from the left-hand hub shown in FIG. 2, pass around idler roller 48 at one corner of the cassette, then pass openings 50, 52 and 54 (FIG. 3) formed in the front wall of the cassette, and then travel around a second idler roller 56 to the spool of tape formed on the right-hand hub 16.

Before the cassette is inserted into the recessed tape deck 12 shown in FIG. 1, the arm 34 carrying the driven capstan 32 will be retracted away from the position shown in FIG. 2 by means of a spring or the like, not shown. This permits the cassette to be positioned over the pins 36; and as it drops into place, the rubber or the like idler roller 26 passes through opening 30 and behind the tape 47. Thereafter, a solenoid 58 is actuated to move the capstan 32 into engagement with the side of the tape opposite the rubber backup roller 30 and is driven by means of motor 64. Due to the relatively large diameter of the capstan 32, it can be driven at a speed to achieve tape speeds as high as 120 inches per second or higher during a tape dubbing operation. The speed of the tape past the head is determined by the speed of the capstan. The drive motor, not shown, connected to shaft 20 simply exerts enough torque on the hub 16 to wind the tape thereon; while the braking means on shaft 18 exerts enough torque on hub 16 to maintain the tape taut in passing the head 22. This assures intimate tape to head contact, which is desirable for proper recording or playback of short-wavelength signals.

As explained above, miniature cassettes of the type shown herein ordinarily are driven by means of a small diameter capstan which assumes the position of the rubber backup roller 26 shown herein. However, the capstan in such cases is typically about one-sixteenth inch in diameter, meaning that it cannot be readily driven at speeds sufficient to achieve a tape speed of 120 inches per second. However, by providing an external capstan which swings into engagement with the side of the tape opposite the rubber idler roller extending through opening 30, for example, much higher tape speeds can be achieved.

After the cassette 14 is inserted into the recessed deck 12 and the capstan 32 moved into engagement with the tape, the tape is caused to move past head 22 at a speed, for example, of 120 inches per second. In the case that such a deck is used for recording, the recording head 22 is connected through lead 21 to a high speed playing deck and cartridge 25 such as that shown in copending application Ser. No. 254,693, filed concurrently herewith. The tape in the cartridge of assembly 25, having a program previously recorded thereon at the normal playing speed of about 3¾ inches per second, is now caused to move at twice the speed of that in cassette 14. Hence, the program on the tape in assembly 25 is rapidly transferred to the tape in cartridge 14. Following the high speed dubbing operation, the cassette, with the program transferred to its tape, can then be removed from deck 12 and transferred to a playing deck where the tape is caused to move at the normal speed of about 1⅞ inches per second, thereby converting the electrical intelligence stored on the tape to recognizable audible sounds.

Alternatively, a high speed cassette deck as described herein, can also be used in a playback mode, and be used in a similar fashion as the high speed cartridge assembly 25, playing an original recording of say 1⅞ inches per second at 120 inches per second for fast transfer to another cassette. In this case, the cassette is used as a master (i.e., as a program source) rather than as a slave (i.e., program acceptor).

As is shown in FIGS. 1 and 2, the cassette 14 is provided with transparent windows 43 through which a spool of tape can be viewed. At the start of a high speed dubbing operation it is, of course, necessary that the tape be wound on the left hub 16 (as viewed in FIG. 2) rather than the right hub. Accordingly, suitable photocell means, not shown, can be caused to view through the windows 43 when the cassette is in place to insure that the tape is wound on the correct hub before the dubbing operation begins.

Figure 6:
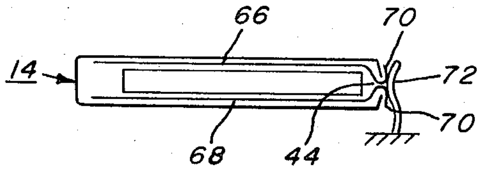
FIG. 6 is a schematic view showing the manner in which the liner of FIG. 5 is used in a cassette.
Figure 5:
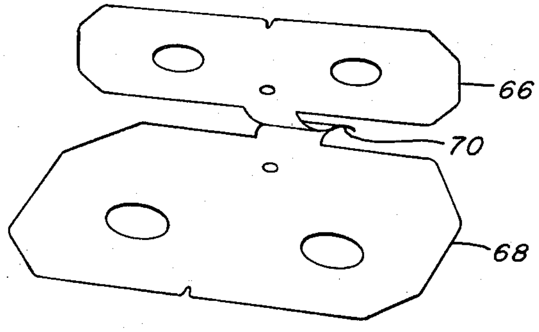
FIG. 5 is an illustration of one type of electrically conductive liner which may be utilized with the cassette of the invention.

As was explained above, the constant friction between the polyester-backed tape 47 and the plastic wall of the cassette will, at high tape speeds, create a buildup of electrostatic charge. This buildup becomes high enough to cause sparking, which may interfere with the recording or may even cause damage to the tape. The present invention eliminates this problem with the use of an electrically conductive liner, one embodiment of which is shown in FIGS. 5 and 6. It comprises upper and lower halves 66 and 68 which have cross-sectional areas essentially matching those of the upper and lower halves 40 and 42 of the cassette 14. These are placed on the inside wall surfaces of the cassette as schematically illustrated in FIG. 6 and are provided with tabs 70 which extend through the seam 44 between the upper and lower halves of the cassette 14 and are bent backwardly against the side wall of the cassette for engagement with a leaf spring 72 connected to a ground plane of the tape deck. Hence, any static electricity which builds up is immediately bled off through the conductive liners 66 and 68 and the spring 72, preventing sparking due to an electrostatic buildup at the high tape speeds employed. The conductivity of the liner need not be high, a conductivity on the order of a few kilohms per square being sufficient.

Figure 7:
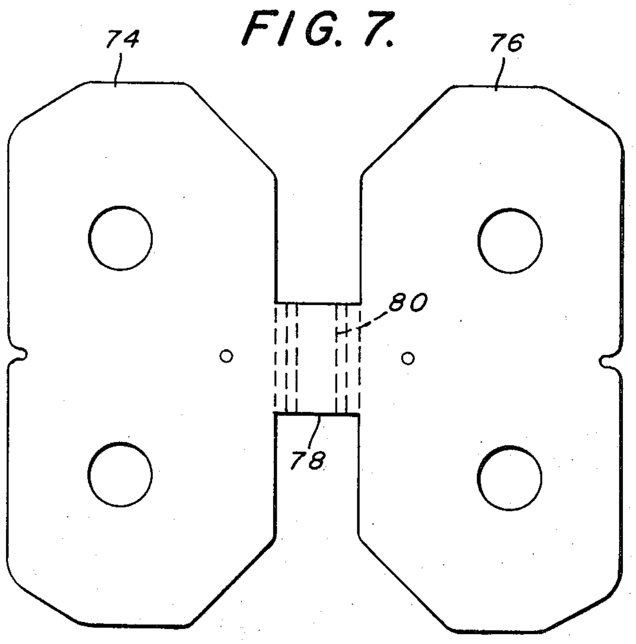
FIG. 7 is an illustration of another type of electrically conductive liner which may be utilized in the cassette of the invention.
Figure 8:
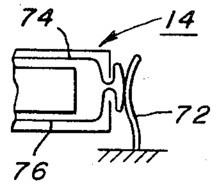
FIG. 8 illustrates the manner in which the liner of FIG. 7 is utilized in a cassette.

Instead of using separate upper and lower conductive liners such as that shown in FIGS. 5 and 6, a one-piece liner can be used as shown in FIGS. 7 and 8. It comprises two halves 74 and 76 interconnected through a tab 78. The tab 78 can be folded along the broken lines 80 into the configuration shown in FIG. 8 with the folded portion engaging the grounded spring 72. The result, of course, is essentially the same with any electrostatic charge being bled off to prevent sparking.

As an alternative, the cassette upper and lower halves could be made of conductive material such as metal, in which case no extending grounding tab is required for the conductive liners, since bleeding of the electrostatic charge can thus take place via the conductive liners, the conductive cassette halves and for instance the pins 36.

Figure 9:
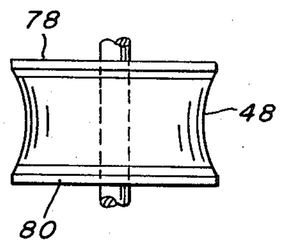
FIG. 9 is an illustration of the hourglass type guiding rollers utilized in the cassette of the invention.

FIG. 9 comprises an enlarged view of the guide rollers 48 and 56 at the corners of the cassette. Note that they are of the hourglass or concave cross-sectional area type. The standard compact-cassette does not utilize any specific means to guide the thin tape around the inside corners of the cassette. Many cassettes have stationary posts in the two lower corners of the cassette, of either simple rod construction or with a more elaborate configuration such as fixed collars or loose washers on either end to keep the tape in place. All of these configurations, however, are adequate only for slow tape speeds and none is adequate for the extremely high tape speed of 120 inches per second required for high speed dubbing. The concave or hourglass configuration shown in FIG. 9 allows the thin tape, which is under controlled tension during a dubbing operation, to seek the path of least resistance and, therefore, results in a smooth even tape pack with no danger of steps developing in the pack which might lead to binding and tape fouling with resulting jamming of the drive mechanism. Collars 78 and 80 may be provided at the opposite edges of the roller 48 shown in FIG. 9 as an additional safety measure. The distance between these collars is somewhat wider than the nominal tape width of about 0.15 inch to allow slight movements of the tape in its efforts for self-alignment. Preferably, the rollers are formed from a low friction material such as Teflon.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A magnetic tape cassette comprising a casing of upper and lower mating halves, a pair of spaced reels within the casing, means for driving one of said reels whereby a tape speed of at least about 120 inches per second is achieved, a plurality of tape guides within the casing, and a magnetic tape extending from one of said reels around said guides to the other of said reels, each of said guides comprising a roller of the hourglass type of generally concave cross-sectional configuration, the tape-engaging surface of the roller defining an arc of a circle in cross section with the roller being symmetrical about a plane passing through the roller midway between its ends.

2. The cassette of claim 1 wherein said rollers are located at two corners of the cassette and are provided with fixed collars at the edges thereof.

* * * * *